(12) United States Patent
Butt et al.

(10) Patent No.: US 8,327,107 B2
(45) Date of Patent: Dec. 4, 2012

(54) VOLUME COHERENCY VERIFICATION FOR SEQUENTIAL-ACCESS STORAGE MEDIA

(75) Inventors: Kevin Dale Butt, Tucson, AZ (US); Paul Merrill Greco, Tucson, AZ (US); Glen Alan Jaquette, Tucson, AZ (US); Paul J. Seger, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 312 days.

(21) Appl. No.: 12/719,441

(22) Filed: Mar. 8, 2010

(65) Prior Publication Data

US 2011/0219199 A1 Sep. 8, 2011

(51) Int. Cl.
*G06F 12/00* (2006.01)

(52) U.S. Cl. .. 711/170; 711/156; 711/201; 711/E12.001

(58) Field of Classification Search ................ 711/114, 711/E12.001, 170, 156, 202, 201, 203, 173
See application file for complete search history.

(56) References Cited

U.S. PATENT DOCUMENTS

| | | | |
|---|---|---|---|
| 5,852,534 A | 12/1998 | Ozue et al. | |
| 6,075,669 A * | 6/2000 | Takayama | 360/69 |
| 6,496,904 B1 | 12/2002 | Noonan | |
| 7,376,796 B2 | 5/2008 | Corbett et al. | |
| 7,434,008 B2 | 10/2008 | Shaw | |
| 7,451,277 B2 | 11/2008 | Guthrie et al. | |
| 7,484,043 B2 | 1/2009 | Heller, Jr. et al. | |
| 8,037,265 B2 * | 10/2011 | Usami | 711/162 |
| 2008/0222389 A1 | 9/2008 | Bruce et al. | |
| 2009/0013106 A1 | 1/2009 | Guldner et al. | |
| 2009/0109571 A1 | 4/2009 | Hood et al. | |
| 2009/0182786 A1 | 7/2009 | Haanpaa et al. | |
| 2009/0193197 A1 | 7/2009 | Stevens et al. | |
| 2009/0248988 A1 | 10/2009 | Berg et al. | |

(Continued)

FOREIGN PATENT DOCUMENTS

DE 3809398 A1 10/1989

(Continued)

OTHER PUBLICATIONS

Tamir, et al., "Multi-Level Coherency Management for High-Performance Shared Virtual Memory Multi-Computers," Computer Science Department, University of California, 1991, CH2859-5/91/0000/0174, Los Angeles, California, USA.

(Continued)

*Primary Examiner* — Pierre-Michel Bataille
(74) *Attorney, Agent, or Firm* — Nelson and Nelson; Daniel P. Nelson; Alexis V. Nelson

(57) ABSTRACT

A method for determining volume coherency is disclosed herein. Upon completing a first write job to a volume partition, the method makes a copy of a volume change reference (VCR) value associated with the volume. The VCR value is configured to change in a non-repeating manner each time content on the volume is modified. Prior to initiating a second write job to the volume partition, the method retrieves the copy and compares the copy to the VCR value. If the copy matches the VCR value, the method determines that a logical object on the partition was not modified between the first and second write jobs. If the copy does not match the VCR value, the method determines that the logical object on the partition was modified between the first and second write jobs. A corresponding system and computer program product are also disclosed herein.

23 Claims, 8 Drawing Sheets

U.S. PATENT DOCUMENTS

2010/0039726 A1* 2/2010 Bates et al. ............ 360/55

FOREIGN PATENT DOCUMENTS

| JP | 09171673 A | 6/1997 |
| WO | WO0109895 A1 | 2/2001 |

OTHER PUBLICATIONS

Muelder, et al., "Interactive Feature Extraction and Tracking by Utilizing Region Coherency," IEEE Pacific Visualization Symposium, 2009, pp. 17-24, 978-1-4244-4404-5/09, Beijing, China.

* cited by examiner

VOLUME COHERENCY VERIFICATION FOR SEQUENTIAL-ACCESS STORAGE MEDIA

FIELD OF THE INVENTION

This invention relates to systems and methods for determining volume coherency, and more particularly to systems and methods for determining if data on a volume is coherent with data on the volume when the volume was last accessed.

BACKGROUND OF THE INVENTION

In storage-area-network (SAN) environments, applications running on host systems (e.g., computers such as open system and/or mainframe servers) may be configured to access data in one or more volumes. These volumes may reside on storage devices, such as disk drives, tape drives, or the like. The applications may access data on (i.e., read or write to) the storage devices using a standard such as SCSI.

Because several applications running either on the same or different host systems may access data on the same volumes, data coherency can become an important issue. That is, in certain cases, an application needs to be able to determine whether other applications have modified or altered the data on the volume since the application last accessed the data on the volume. This can be particularly important with volumes stored on tape drives or other sequential-access storage media devices.

If an application can quickly establish coherency (i.e., determine that the data was not modified since it was last accessed by the application), the application can trust the integrity of the data and perform operations on the data accordingly. On the other hand, if the application cannot establish coherency, the application may not be able to trust the integrity of the data. In such cases, the application may need to read all or a substantial part of the data on the volume to verify the integrity of the data and/or learn what is actually stored on the volume. This can be a very time-consuming and inefficient process.

In view of the foregoing, what is needed is a system and method for quickly determining the coherency of a volume. Such a determination ideally could be made with little or no inspection of data on the volume. Further needed are systems and methods to make sequential-access storage media, such as magnetic tape, more self-describing.

SUMMARY

The invention has been developed in response to the present state of the art and, in particular, in response to the problems and needs in the art that have not yet been fully solved by currently available systems and methods. Accordingly, the invention has been developed to provide systems and methods to enable an application to determine if logical objects on a volume are coherent with those that existed when the application last wrote to the volume. The features and advantages of the invention will become more fully apparent from the following description and appended claims, or may be learned by practice of the invention as set forth hereinafter.

Consistent with the foregoing, a method for enabling an application to determine if logical objects on a volume are coherent with the last time the application wrote to the volume is disclosed herein. Upon completing a first write job to a partition on a volume, the method makes a copy of a volume change reference (VCR) value associated with the volume. The VCR value is configured to change in a non-repeating manner each time content on the volume is modified. Prior to initiating a second write job to the partition, the method retrieves the copy and compares the copy to the VCR value. In the event the copy matches the VCR value, the method determines that a logical object on the partition was not modified in the period between the first and second write jobs. Conversely, in the event the copy does not match the VCR value, the method determines that the logical object on the partition was modified in the period between the first and second write jobs.

A corresponding system and computer program product are also disclosed and claimed herein.

BRIEF DESCRIPTION OF THE DRAWINGS

In order that the advantages of the invention will be readily understood, a more particular description of the invention briefly described above will be rendered by reference to specific embodiments illustrated in the appended drawings. Understanding that these drawings depict only typical embodiments of the invention and are not therefore to be considered limiting of its scope, the invention will be described and explained with additional specificity and detail through use of the accompanying drawings, in which.

DETAILED DESCRIPTION

Figure 1:
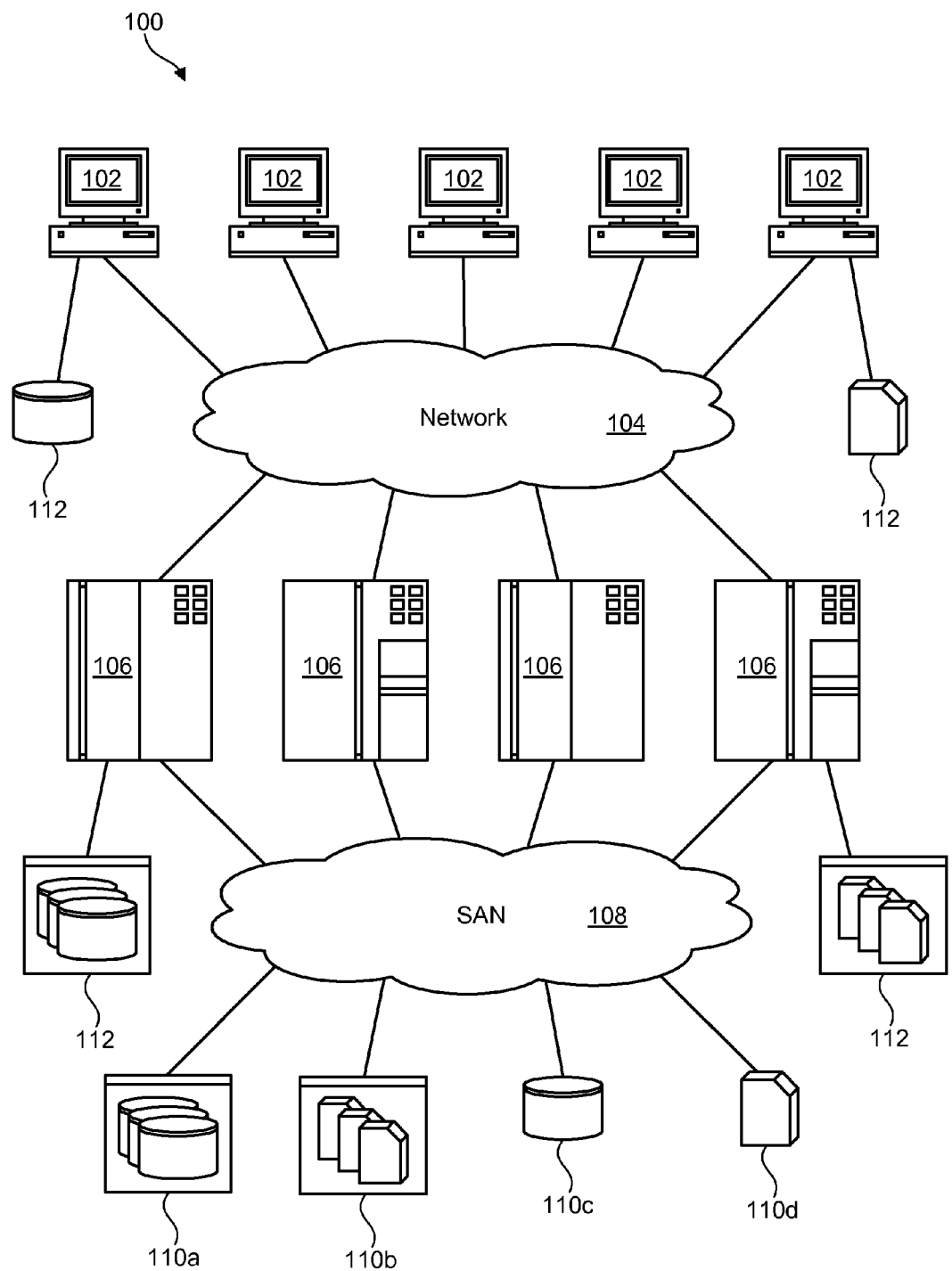
FIG. 1 is a high-level block diagram showing an example of a network environment comprising a storage-area-network (SAN)

It will be readily understood that the components of the present invention, as generally described and illustrated in the Figures herein, could be arranged and designed in a wide variety of different configurations. Thus, the following more detailed description of the embodiments of the invention, as represented in the Figures, is not intended to limit the scope of the invention, as claimed, but is merely representative of certain examples of presently contemplated embodiments in accordance with the invention. The presently described embodiments will be best understood by reference to the drawings, wherein like parts are designated by like numerals throughout.

As will be appreciated by one skilled in the art, the present invention may be embodied as an apparatus, system, method, or computer program product. Furthermore, the present invention may take the form of a hardware embodiment, a software embodiment (including firmware, resident software, micro-code, etc.) configured to operate hardware, or an embodiment combining software and hardware aspects that may all generally be referred to herein as a "module" or "system." Furthermore, the present invention may take the form of a computer-readable storage medium embodied in any tangible medium of expression having computer-usable program code stored therein.

Any combination of one or more computer-usable or computer-readable storage medium(s) may be utilized to store the computer program product. The computer-usable or computer-readable storage medium may be, for example, but not limited to, an electronic, magnetic, optical, electromagnetic, infrared, or semiconductor system, apparatus, or device. More specific examples (a non-exhaustive list) of the computer-readable storage medium may include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, or a magnetic storage device. In the context of this document, a computer-usable or computer-readable storage medium may be any medium that can contain, store, or transport the program for use by or in connection with the instruction execution system, apparatus, or device.

Computer program code for carrying out operations of the present invention may be written in any combination of one or more programming languages, including an object-oriented programming language such as Java, Smalltalk, C++, or the like, and conventional procedural programming languages, such as the "C" programming language or similar programming languages. Computer program code for implementing the invention may also be written in a low-level programming language such as assembly language.

The present invention may be described below with reference to flowchart illustrations and/or block diagrams of methods, apparatus, systems, and computer program products according to embodiments of the invention. It will be understood that each block of the flowchart illustrations and/or block diagrams, and combinations of blocks in the flowchart illustrations and/or block diagrams, can be implemented by computer program instructions or code. These computer program instructions may be provided to a processor of a general-purpose computer, special-purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

The computer program instructions may also be stored in a computer-readable storage medium that can direct a computer or other programmable data processing apparatus to function in a particular manner, such that the instructions stored in the computer-readable storage medium produce an article of manufacture including instruction means which implement the function/act specified in the flowchart and/or block diagram block or blocks. The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

Referring to FIG. 1, one example of a network architecture 100 is illustrated. The network architecture 100 is presented to show one example of an environment where a system and method in accordance with the invention may be implemented. The network architecture 100 is presented only by way of example and not limitation. Indeed, the systems and methods disclosed herein may be applicable to a wide variety of different network architectures, in addition to the network architecture 100 shown.

As shown, the network architecture 100 includes one or more computers 102, 106 interconnected by a network 104. The network 104 may include, for example, a local-area-network (LAN) 104, a wide-area-network (WAN) 104, the Internet 104, an intranet 104, or the like. In certain embodiments, the computers 102, 106 may include both client computers 102 and server computers 106 (also referred to herein as "host systems" 106). In general, the client computers 102 initiate communication sessions, whereas the server computers 106 wait for requests from the client computers 102. In certain embodiments, the computers 102 and/or servers 106 may connect to one or more internal or external direct-attached storage systems 112 (e.g., arrays of hard-disk drives, solid-state drives, tape drives, etc.). These computers 102, 106 and direct-attached storage systems 112 may communicate using protocols or standards such as ATA, SATA, SCSI, SAS, Fibre Channel, or the like.

The network architecture 100 may, in certain embodiments, include a storage network 108 behind the servers 106, such as a storage-area-network (SAN) 108 or a LAN 108 (e.g., when using network-attached storage). This network 108 may connect the servers 106 to one or more storage systems 110, such as arrays 110a of hard-disk drives or solid-state drives, tape libraries 110b, individual hard-disk drives 110c or solid-state drives 110c, tape drives 110d, CD-ROM libraries, or the like. To access a storage system 110, a host system 106 may communicate over physical connections from one or more ports on the host 106 to one or more ports on the storage system 110. A connection may be through a switch, fabric, direct connection, or the like. In certain embodiments, the servers 106 and storage systems 110 may communicate using a standard such as SCSI over Fibre Channel (FC).

Figure 2:
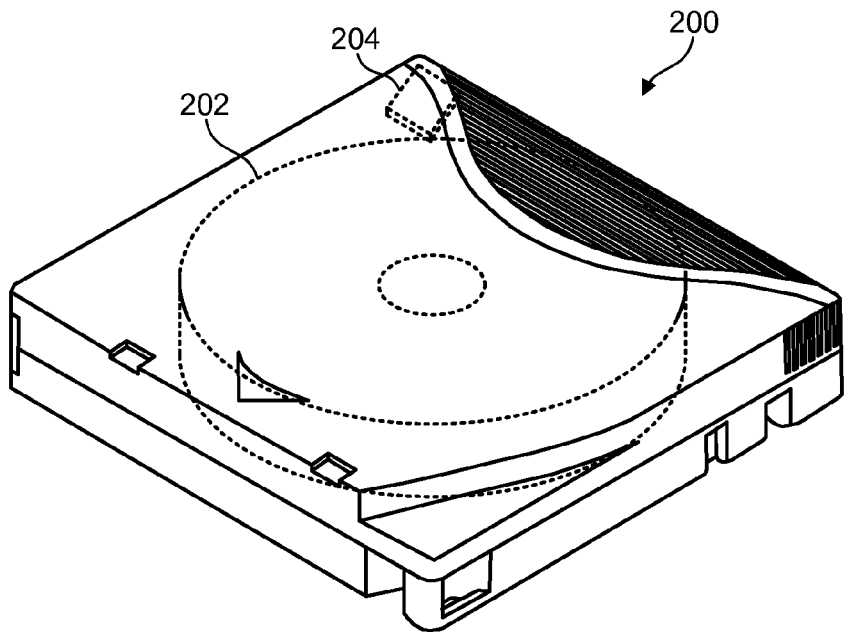
FIG. 2 is an isometric view of one example of a removable data storage cartridge containing magnetic tape and a cartridge memory.

Referring to FIG. 2, a tape drive 110d (or tape library 110b containing one or more tape drives 110d) may be configured to read and write on magnetic tape 202 contained within a removable data storage cartridge 200. In selected embodiments, the data storage cartridge 200 includes a cartridge memory chip 204 to store information about the cartridge 200, the magnetic media 202 inside the cartridge 200, as well as the data stored on the magnetic media 202. In selected embodiments, the tape drive 110d communicates with the cartridge memory 204 using a contactless low-level radio frequency (RF) field that is generated by the tape drive 110d. Unlike the magnetic tape 202, which is a sequential-access storage media, the cartridge memory chip 204 may be a random-access memory such as an electronically erasable programmable read-only Memory (EEPROM) with both read-only and rewritable areas. One example of a data store cartridge 200 similar to that illustrated in FIG. 2 is a Linear Tape Open (LTO) data cartridge 200, the likes of which are well known in the art. The illustrated embodiment 200 is a single-reel cartridge 200 although embodiments of the invention may also be applicable to data storage cartridges 200 containing multiple reels.

Figure 3:
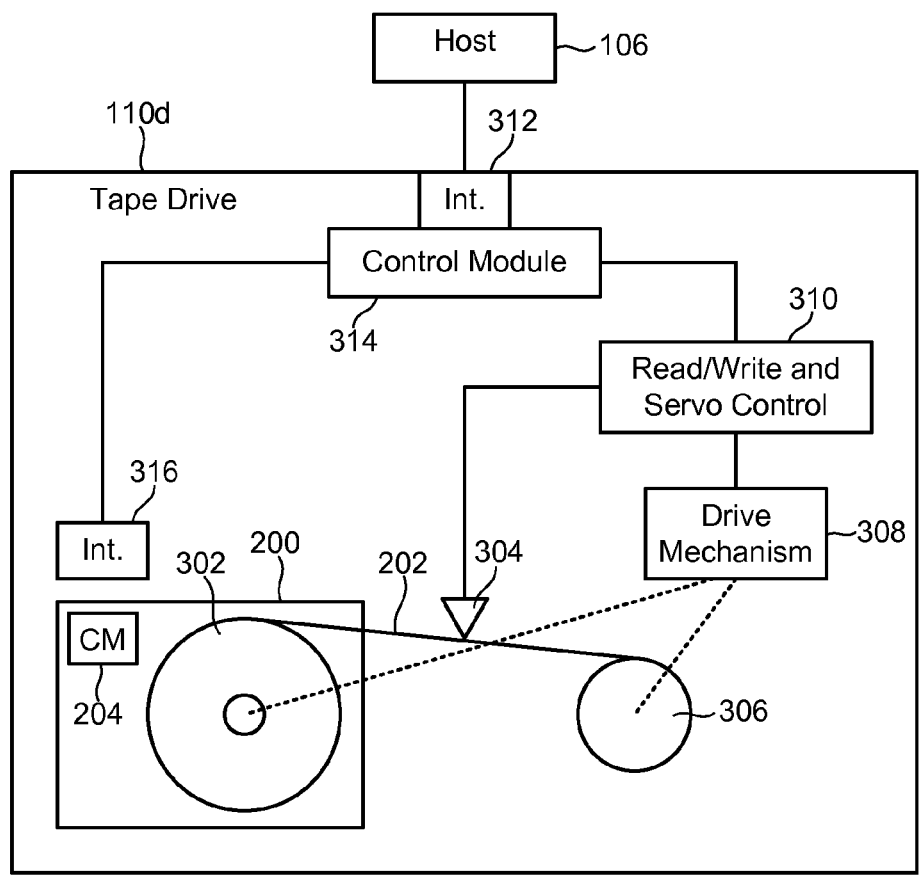
FIG. 3 is a high-level block diagram showing one example of a tape drive interacting with the removable data storage cartridge shown in FIG. 2.

Referring to FIG. 3, one embodiment of a tape drive 110d interacting with a single-reel data storage cartridge 200 is illustrated. The tape drive 110d and its operation are presented only by way of example and are not intended to be limiting. As shown, upon loading the cartridge 200 into the tape drive 110d, the magnetic tape 202 on the reel 302 is fed onto a take-up reel 306 in the tape drive 110d. The magnetic tape 202 is moved across a read/write head 304, which reads and/or writes to the magnetic tape 202. A drive mechanism 308, which may include a motor as well as mechanical linkage to the reels 302, 306, moves the magnetic tape 202 across the read/write head 304. While the magnetic tape 202 is moving across the read/write head 304, a read/write and servo control 310 precisely controls the velocity of the drive mechanism 308 and the position of the read/write head 304 relative to the magnetic tape 202.

In selected embodiments, the read/write and servo control 310 includes functionality to determine the location of the read/write head 304 relative to the magnetic tape 202. For example, the read/write and servo control 310 and read/write head 304 may utilize servo signals on the magnetic tape 202 to determine the location of the read/write head 304 relative to the magnetic tape 202. In other embodiments, the read/write and servo control 310 uses a tachometer to determine the location of the read/write head 304 relative to the magnetic tape 202. The read/write head 304 and read/write and servo control 310 may include hardware elements and associated logic, such as a processor operated by software, microcode, firmware, hardware logic, or a combination thereof.

A host system 106 or other external device 106 may communicate with the tape drive 110d (by issuing SCSI commands to the tape drive 110d, for example, and waiting for responses from the tape drive 110d) by way of an interface 312. Alternatively, the tape drive 110d may form part of a larger storage subsystem, such as a tape library, which may itself communicate with the host system 106 or other external device 106. In such an embodiment, the storage subsystem may communicate with the tape drive 110d through the interface 312. A control module 314 may communicate with the interface 312, the read/write and servo control 310, and a memory interface 316. The memory interface 316 may, in turn, wirelessly communicate with (i.e., read and write to) the cartridge memory 204 inside the cartridge 200. The control module 314 may be implemented with hardware elements and associated logic, such as a processor operated by software, microcode, firmware, hardware logic, or a combination thereof.

One example of a magnetic tape drive 110d operating in a manner similar to that described in FIG. 3 is the IBM 3580 Ultrium magnetic tape drive based on LTO technology. Nevertheless, embodiments of the invention are also applicable to other types of tape drives, such as those interfacing with dual-reel magnetic tape cartridges 200, or the like. Embodiments of the invention may also be applicable to other storage media types and drives such as optical disk cartridges and drives, optical tape cartridges and drives, removable computer diskettes and drives, rigid magnetic disk cartridges and drives, and the like.

Figure 4:
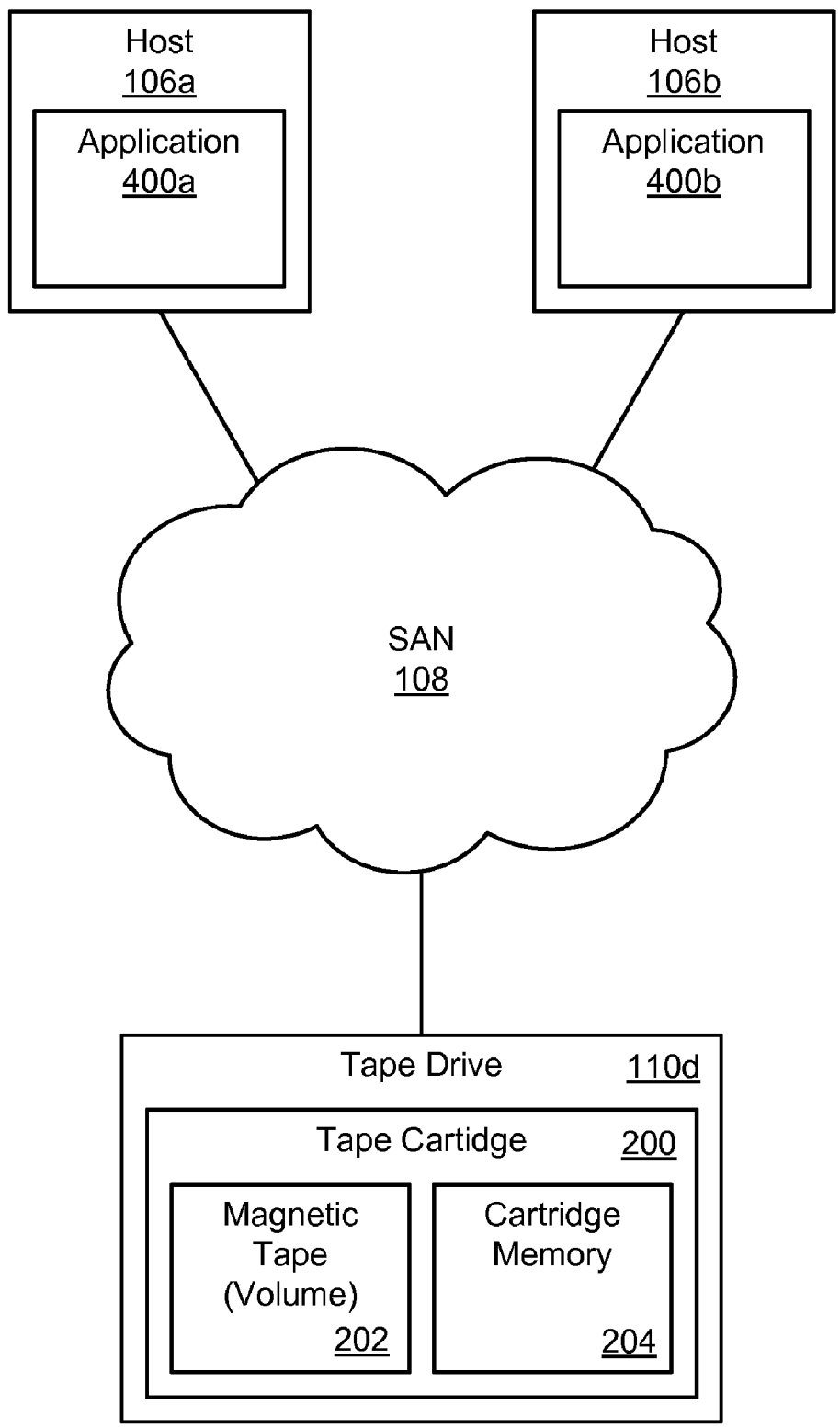
FIG. 4 is a high-level block diagram showing multiple applications accessing content on the same tape drive.

Referring to FIG. 4, in SAN environments 108, applications 400a, 400b running on either the same or different host systems 106a, 106b may be configured to access data in one or more volumes 202. A volume 202 may reside, for example, on the magnetic tape 202 of a data storage cartridge 200. The applications 400a, 400b may access data on (i.e., read or write data to) the volume 202 by issuing commands (e.g., SCSI read and write commands) to the tape drive 110d that contains the data storage cartridge 200, or alternatively, to the storage subsystem 110 (e.g., tape library) that contains the data storage cartridge 200.

Because several applications 400a, 400b running on either the same or different host systems 106a, 106b may access data on the same volume 202 (i.e., the same magnetic tape 202), data coherency can be an important issue. That is, in certain cases, an application 400a needs to be able to determine whether another application 400b modified or altered the data on the volume 202 since the application 400a last accessed the data on the volume 202. This can be particularly important with tape drives 110d and other sequential-access storage media.

If the application 400a can quickly establish coherency (i.e., determine that the data on the volume 202 is unmodified since it was lass accessed by the application 400a), the application 400a can trust the integrity of the data and perform operations on the data accordingly. On the other hand, if the application 400a cannot establish coherency, the application 400a may not trust the integrity of the data. In such cases, the application 400a may need to read all or a substantial part of the data on the volume 202 to verify the integrity of the data and/or learn what is actually stored on the volume 202. This can be a very time-consuming and inefficient process.

Figure 5A:
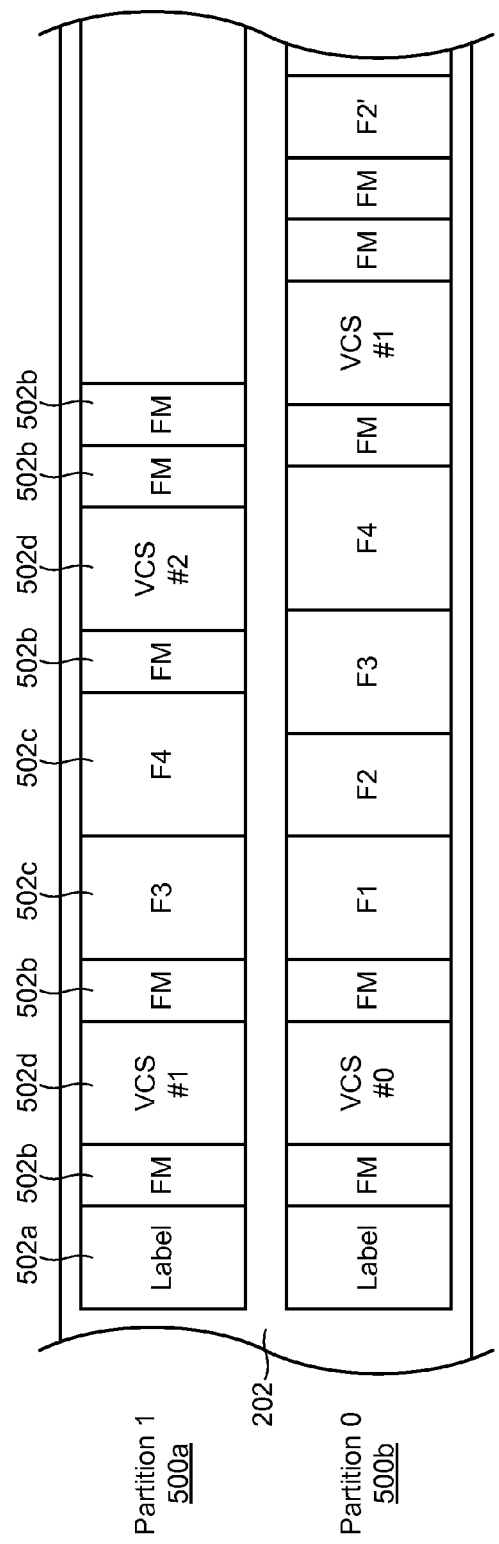
FIGS. 5A and 5B are high-level block diagrams showing various types of data stored on the magnetic tape and the cartridge memory to maintain volume coherency.

Referring to FIG. 5A, while continuing to refer generally to FIG. 4, in order to address the above-described problem, various types of information may be stored on the magnetic tape 202 and in the cartridge memory 204 (a type of medium auxiliary memory, or MAM, in SCSI terminology) so that an application 400 can verify volume coherency. As shown in FIG. 5A, in selected embodiments, a volume 202 may be divided into two or more logical partitions 500a, 500b (herein labeled "Partition 0" and "Partition 1"). Each of these partitions 500a, 500b may store data encapsulated in one or more logical objects. These logical objects may include, for example, a label 502a for a partition 500, a file mark 502b, or a logical block 502c that makes up all or part of a file (a group of logical blocks 502c between the file marks 502b make up a file). A logical object may also include a volume coherency set (VCS) 502d, the purpose of which will be explained in more detail hereafter.

Figure 5B:
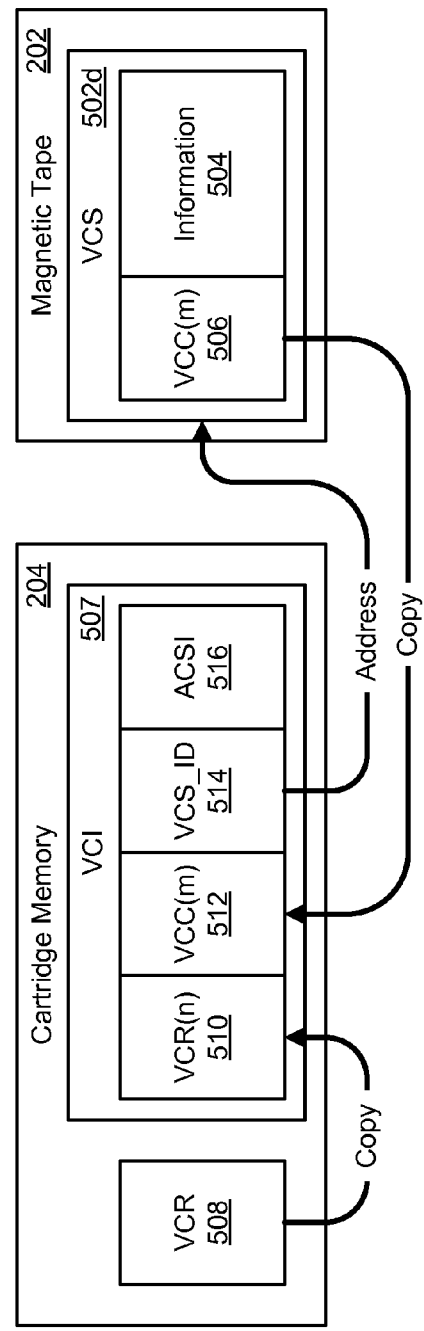

Referring to FIG. 5B, for the purposes of this disclosure, a "volume coherency set" (VCS) 502d contains a set of information 504, written to a partition 500, for which coherency is desired. The information 504 contained in the VCS 502d may vary for different applications 400. An application 400, for example, may store an index 504 for the volume 202 in the VCS 502d. When the application 400 mounts the volume 202, the application 400 may verify the coherency of the volume 202 and retrieve the most recently written VCS 502d, which contains the most recent up-to-date index. An index represents just one type of information 504 that can be stored in the VCS 502d and is not intended to be limiting.

The VCS 502d stores a "volume coherency count" (VCC) 506. An application 400 maintains one VCC for an entire volume 202 and monotonically increases the VCC when the state of the VCS 502d changes. Writing identical volume coherency sets (VCSs) 502d to each partition 500a, 500b does not force a change of the application's volume coherency count (VCC) since, in this situation, the state of the volume coherency set (VCS) 502d does not change. An application 400 may write a volume coherency set (VCS) 502d to a partition 500 at various times, such as when a write job to the partition 500 is complete. It should be noted that verifying the coherency of a VCS 502d will also verify the coherency of all logical objects 502 on the partition 500 prior to the VCS 502d, due to the way in which data is written to tape 202 or other sequential-access storage media.

A single volume change reference (VCR) value 508, stored in cartridge memory 204 as a MAM attribute, is maintained for the entire volume 202. This value 508 changes in a non-repeating manner (e.g., increments) each time content on the volume 202 is modified. When data is written to the volume 202, the VCR value 508 changes and is written to the cartridge memory 204 as a MAM attribute before the data becomes valid for reading. The VCR value 508 is controlled internally by the tape drive 110d and can be read but not modified by an external application 400.

Unlike the VCR value 508, where a single value is maintained for the entire volume 202, a "volume coherency information" (VCI) attribute 507 is stored and maintained in cartridge memory 204 as a MAM attribute for each partition 500 that resides on the volume 202. Unlike the VCR value 508, an external application 400 can read and modify the VCI MAM attribute 507 (using, for example, the "WRITE ATTRIBUTE" and "READ ATTRIBUTE" commands in the SCSI standard). The VCI attribute 507 stores various types of information about the VCS 502d that was last written to the partition 500. For example, the VCI attribute 507 stores a copy 510, or "snapshot" 510, of the VCR value 508 as it existed when the last VCS 502d was written to the partition 500. The VCI attribute 507 also stores a copy 512 of the VCC 506 and a volume coherency set identifier (VCS_ID) 514 for the last written VCS 502d. The VCS_ID 514 is the location 514 (i.e., address) on the partition 500 for the last written VCS 502d. The VCI attribute 507 may also store application client specific information (ACSI) 516 that the application 400 binds with the VCS 502d referenced by the VCS_ID 514.

As shown by the arrows in FIG. 5B, when an application 400 writes a VCS 502d to a partition 500, the application 400 makes a copy of the VCR value 508 and stores it in the VCR field 510 of the VCI attribute 507. The application 400 also makes a copy of the VCC 506 in the VCS 502d and stores it in the VCC field 512 of the VCI attribute 507. The application 400 also determines the address of the VCS 502d on the partition 500 and stores it in the VCS_ID field 514 of the VCI attribute 507. This process will be explained in more detail in the description associated with FIG. 6. The manner in which an application 400 uses the information in the VCI attribute 507 to later determine volume coherency will be discussed in association with FIG. 7.

Figure 6:
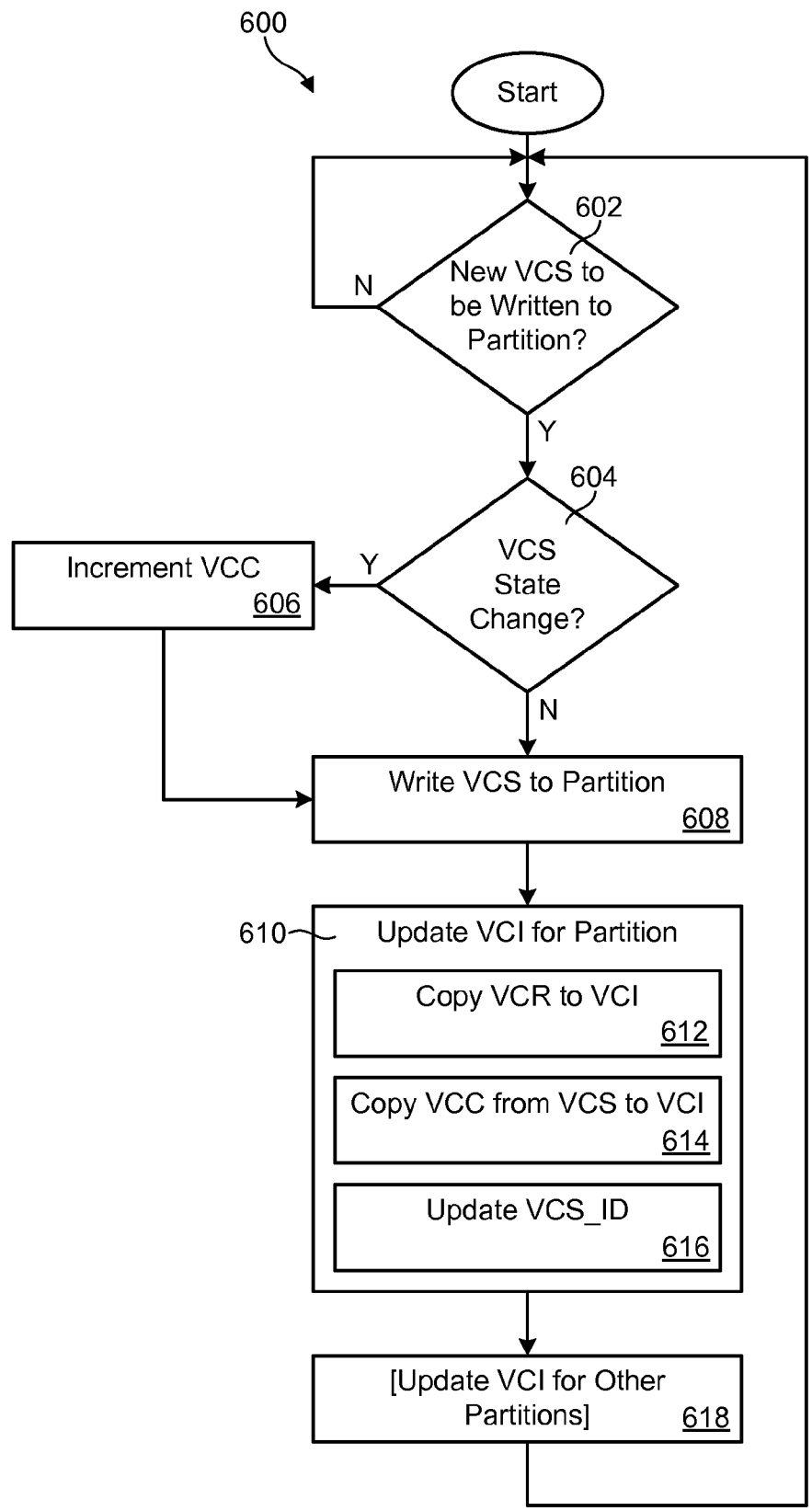
FIG. 6 is a flow diagram showing one embodiment of a method for writing a volume coherency set (VCS) to the magnetic tape and updating the volume coherency information (VCI) attribute in the cartridge memory.

Referring to FIG. 6, one embodiment of a method 600 for writing a volume coherency set (VCS) 502d to a partition 500 and updating the volume coherency information (VCI) attribute 507 associated with the partition 500 is illustrated. As shown, the method 600 initially determines 602 whether a new VCS 502d is to be written to a partition 500. This may occur, for example, when an application 400 finishes a write job to the partition 500 and generates an index for data stored on the volume 202. The application 400 may store the index 504 or other desired information 504 in the VCS 502d. The method 600 may then determine 604 whether the state of the VCS 502d has changed. For example, if an application 400 stores an index in the VCS 502d, the method 600 may determine 604 whether the index has been updated or modified in some manner since the last VCS 502d was written. If so, the method 600 increments 606 the volume coherency count (VCC) and writes 608 the VCS 502d to the partition 500. On the other hand, if the index has not changed since the last VCS 502d was written, the method 600 simply writes 608 the VCS 502d to the partition 500 without updating the VCC.

Once the VCS 502d is written to the partition 500, the method 600 updates 610 the volume coherency information (VCI) attribute 507 associated with the partition 500. This includes copying 612 the VCR value 508 to the VCR field 510 of the VCI attribute 507, copying 614 the VCC 506 to the VCC field 512 of the VCI attribute 507, and updating 616 the VCS_ID field 514 to contain the address of the VCS 502d on the partition 500. By updating 610 the VCI attribute 507 associated with the partition 500 when a VCS 502d is written to the partition 500, an application 400 can later verify the consistency of the partition 500.

Optionally, to enable the application 400 to verify the consistency of the entire volume 202 (and not just a single partition 500) at a later time, the application 400 may be configured to update 618 the VCI attributes 507, and more specifically the VCR fields 510, for other partitions 500 on the volume 202 when a VCS 502d is written to a partition 500. For example, when an application 400 writes 608 a VCS to a partition 500, the application 400 may update the VCR field 510 not only for the partition 500 that stores the VCS 502d, but also the VCR fields 510 for other partitions 500 on the volume 202. As will be explained in more detail in association with FIG. 7, this may be used to later check the consistency of the entire volume 202 and not just the partition 500 that stores the VCS 502d.

Figure 7:
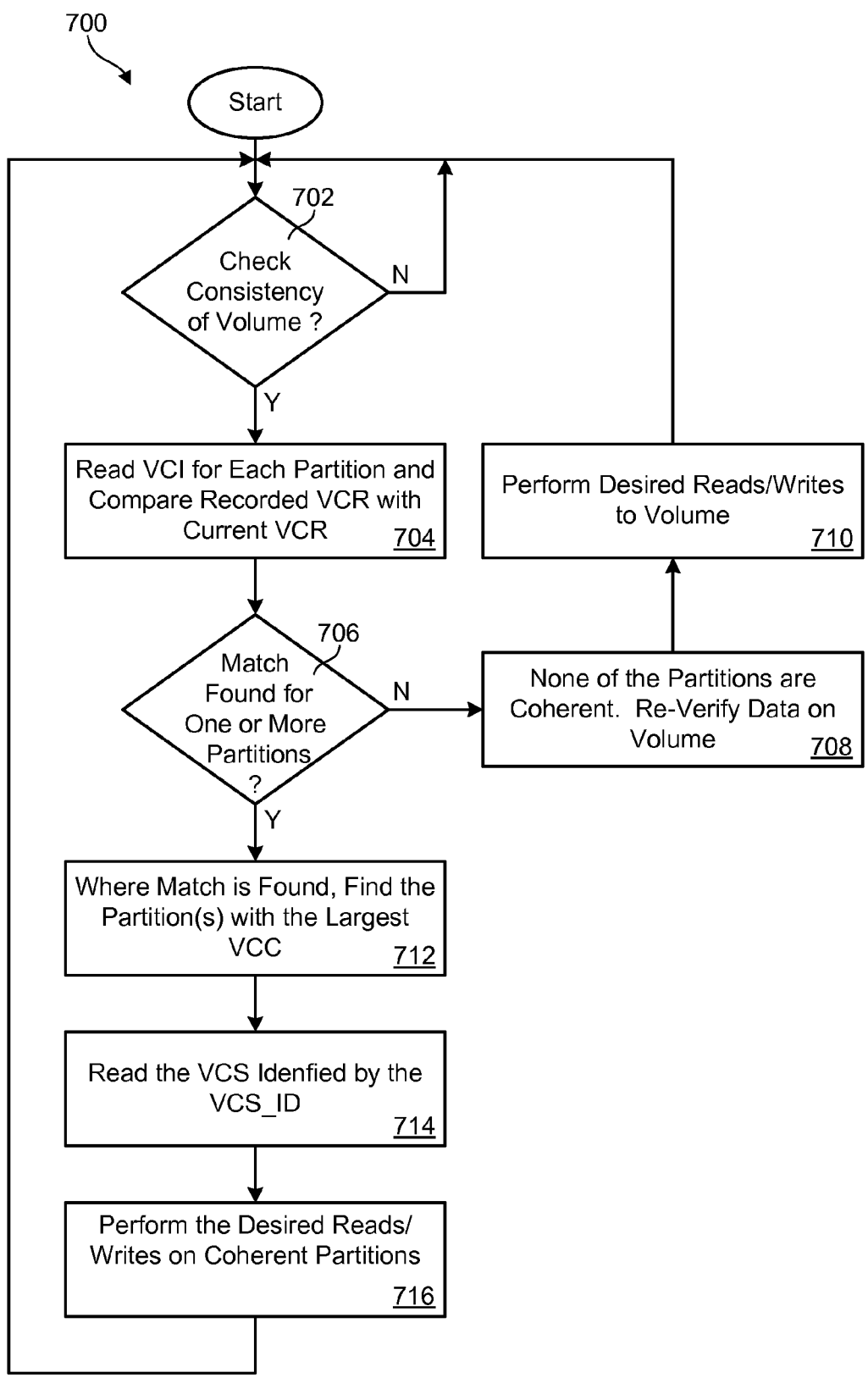
FIG. 7 is a flow diagram showing one embodiment of a method for determining volume coherency prior to reading or writing data on the volume.

Referring to FIG. 7, one embodiment of a method 700 for determining the coherency of a volume 202 (or one or more partitions 500 on the volume 202) is illustrated. Such a method 700 may be performed to ensure data integrity on a volume 202 prior to accessing data on the volume 202. An application 400, for example, may perform the method 700 upon mounting the volume 202 but prior to accessing data on the volume 202.

As shown, the method 700 initially determines 702 whether to check the consistency of the volume 202. If a decision is made to check the consistency of the volume 202, the method 700 reads 704 the VCI attribute 507 for each partition 500 and compares 704 the value in the VCR field 510 with the current VCR value 508. If no match is found 706, the method 700 determines that none of the partitions 500 on the volume 202 are consistent with the partitions 500 on the volume 202 when it was last accessed. In such a case, the method 700 may re-verify 708 the data on the volume 202 by reading all or a substantial part of the data on the volume 202. Once the content on the volume 202 is verified, the method 700 may perform 710 the desired reads and/or writes to one or more partitions 500 on the volume 202.

On the other hand, if the method 700 finds 706 a match for one or more partitions 500 on the volume 202, it can be assumed that these partitions 500 are unmodified since the last time they were accessed. For VCI attributes 507 where a match is found 706, the method 700 finds 712 the VCI attribute 507 that has the largest VCC 512. This VCI attribute 507 will identify the most recently updated VCS 502d. The method 700 may then locate and read 714 the VCS 502d in the partition 500 using the VCS_ID 514. If the information 504 in the VCS 502d contains an index, this index will be the most recent, up-to-date index 504.

Once the VCS 502d identified in step 712 has been read 714, the method 700 may perform 716 any desired reads and/or writes to partitions 500 where consistency has been verified. If consistency cannot be verified for some partitions 500, the method 700 may read all or a substantial part of the data on these partitions 500 to verify what is on the partitions 500. Reads and/or writes may then be performed 716 on these partitions 500, if desired. Once a write job is finished, a new VCS 502d may be written to one or more of the partitions 500 as described by the method 600 of FIG. 6, and the process may repeat. In this way, coherency may be maintained and verified on a volume 202.

Figure 8:
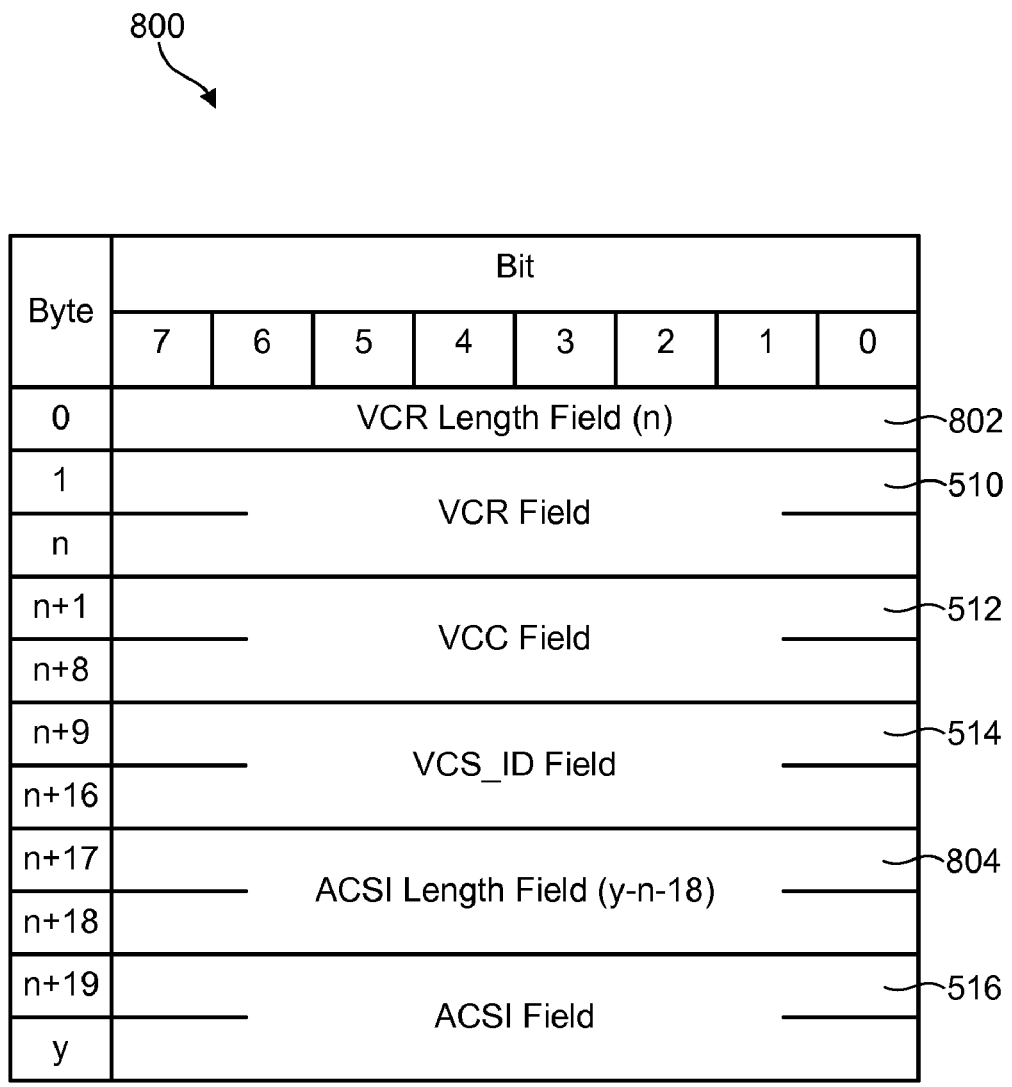
FIG. 8 is a high-level block diagram showing one possible format for the volume coherency information (VCI) attribute in the cartridge memory.

FIG. 8 shows one embodiment of a format 800 for the volume coherency information (VCI) attribute 507 in the cartridge memory 204. This format 800 is provided only by way of example and is not intended to be limiting. Similarly, the number of bits and bytes allocated for each of the fields in the format 800 may be varied. As shown, the format 800 includes a VCR field 510, VCC field 512, VCS_ID field 514, and ACSI field 516. In this particular example, the lengths of some fields (i.e., the VCC field 512 and the VCS_ID field 514) are fixed and the lengths of other fields (i.e., the VCR field 510 and the ACSI field 516) are variable, although this can be modified as needed. Where the lengths are variable, length fields 802, 804 may be provided to designate the lengths of other fields. In this example, the lengths of the VCR field 510 and the ACSI field 516 are both variable and thus include length fields 802, 804. The variable length VCR field 510 may be adjusted to match the length of the VCR value 508 in cartridge memory 204, which may differ for different drives 110d and/or storage cartridges 200.

Figure 9:
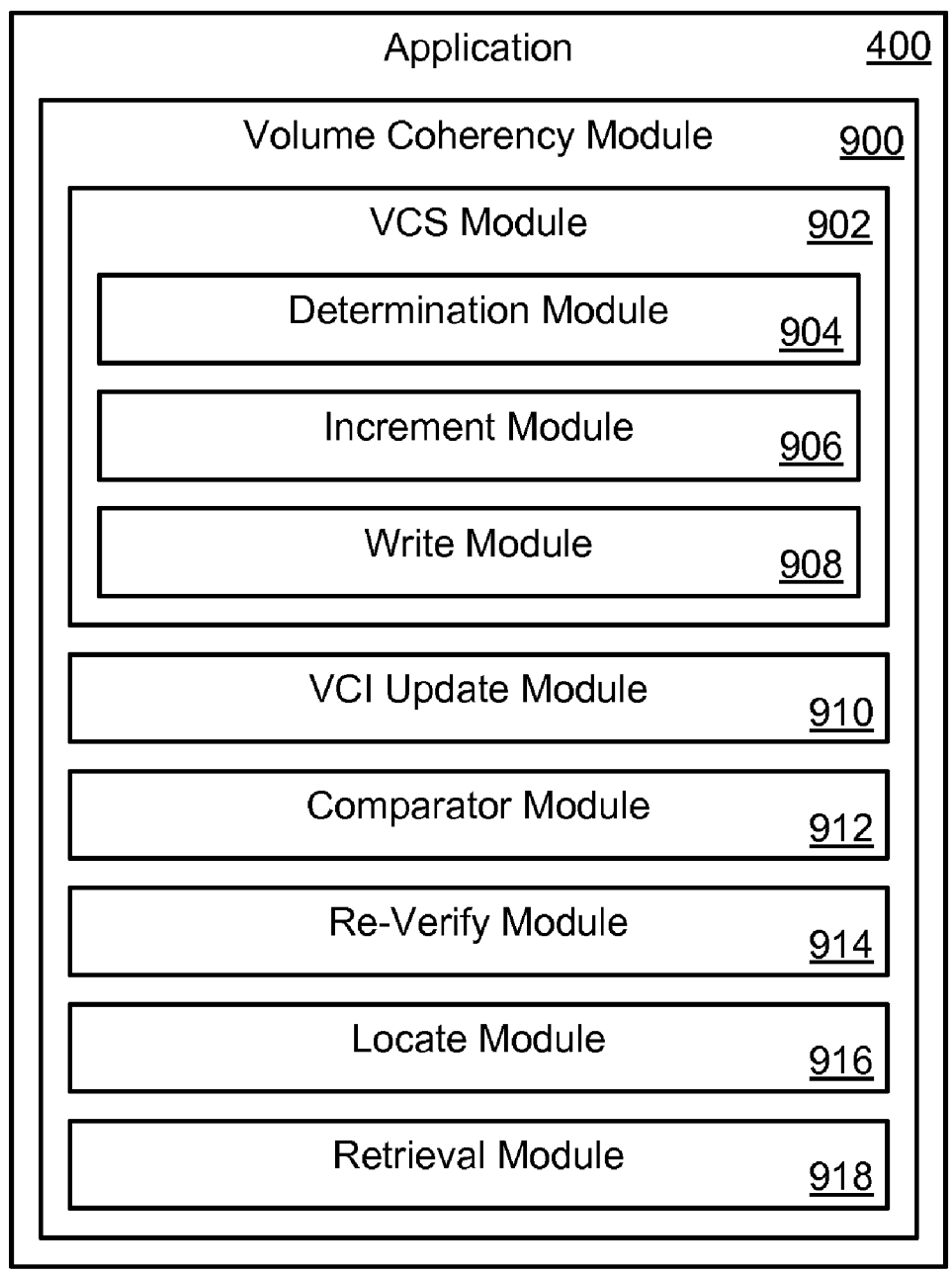
FIG. 9 is a high-level block diagram showing one embodiment of a volume coherency module for implementing the methods illustrated in FIGS. 5 through 7.

Referring to FIG. 9, the methods 600, 700 described in FIGS. 6 and 7 may be implemented in the form of one or more modules. These modules may be implemented in hardware, software or firmware executable on hardware, or a combination thereof. These modules are presented only by way of example and are not intended to be limiting. Indeed, alternative embodiments may include more or fewer modules than those illustrated. Furthermore, it should be recognized that, in some embodiments, the functionality of some modules may be broken into multiple modules or, conversely, the functionality of several modules may be combined into a single module or fewer modules. It should also be recognized that the modules are not necessarily implemented in the locations where they are illustrated. For example, some functionality shown in an application 400 may actually be implemented in a storage subsystem 110 or drive 110. Other functionality shown only in the application 400 may actually be distributed across the application 400 and the storage subsystem 110 and/or drive 110. Thus, the location of the modules is presented only by way of example and is not intended to be limiting.

As shown, the application 400 includes a volume coherency module 900 to verify the coherency of a volume 202. The application 400 may use this module 900 to determine whether other applications have modified or altered the data on the volume 202 since the application 400 last accessed the data on the volume 400. As shown, the volume coherency module 900 includes a VCS module 902, a VCI update module 910, a comparator module 912, and re-verify module 914, a locate module 916, and a retrieval module 918.

The VCS module 902 may be used to write volume coherency sets (VCSs) 502d to partitions 500 on the volume 202, such as after write jobs are complete. The VCS module 902 may include one or more of a determination module 904, an increment module 906, and a write module 908. Once a decision has been made to write a VCS 502d to a partition 500, the determination module 904 determines whether the state of the VCS 502d has changed since the last VCS 502d was written. For example, if the last VCS 502d contained an index, the determination module 904 determines whether the index has changed. If so, the increment module 906 increments the volume coherency count (VCC) associated with the volume 202. A write module 908 then writes the VCS 502d with the updated VCC 506 to the partition 500. On the other hand, if the state of the VCS 502d has not changed, the write module 908 simply writes the VCS 502d to the partition 500 without incrementing the VCC 506.

Once the VCS 502d has been written to the partition 500, the VCI update module 910 updates the volume coherency information (VCI) attribute 507 associated with the partition 500. This includes copying the volume change reference (VCR) 508 to the VCI attribute 507, copying the VCC 506 (in the VCS 502d) to the VCI attribute 507, and updating the VCS_ID 514. The application 400 should ensure that no other applications update the logical objects on the volume 202 from the time the application 400 completes writing to the partition 500 to the time the application 400 updates the VCI attribute 507 (e.g., by using reservations).

In selected embodiments, the VCI update module 910 will update the VCI attribute 507 for just the partition 500 that stores the VCS 502d. This may be used to later verify the consistency of the partition 500. In other embodiments, the VCI update module 910 also updates the VCI attributes 507 (and more specifically the VCR fields 510) for the other partitions 500 on the volume 202. This may be performed to later verify the consistency of the entire volume 202 as opposed to just the partition 500 where the VCS 502d was written.

To enable an application 400 to check the consistency of a specific partition 500 or the volume 202 as a whole, the comparator module 912 reads the VCI attribute 507 for each partition 500 where consistency is desired and compares the values in the VCR fields 510 with the current VCR value 508. If no match is found, none of the partitions 500 on the volume 202 are consistent and a re-verify module 914 may need to re-verify the data on the volume 202. This may be accomplished by reading all or a substantial part of the data on the volume 202. Once the content on the volume 202 is verified, the application 400 can perform the desired reads and/or writes to the volume 202.

If, on the other hand, the comparator module 912 finds a match for one or more of the recorded VCR values 510 and the current VCR value 508, the application 400 assumes that the partitions 500 associated with the matching VCR values 510 are unmodified since the last time they were accessed. For partitions 500 that have matching VCR values 510, the locate module 916 finds the VCI attribute 507 that has the largest VCC value 512. This VCI attribute 507 will identify the most recently written VCS 502d as well as the location of the VCS 502d.

Once the most recently written VCS 502d is identified, the retrieval module 918 retrieves the VCS 502d using the VCS_ID 514. If multiple volume coherency sets (VCSs) 502d contain the same largest VCC 512, the retrieval module 918 may retrieve any of the volume coherency sets (VCSs) 502d since they contain the same information 504. In such a situation, the retrieval module 918 may choose to retrieve the VCS 502d that is closest on the tape 202. If the information 504 in the most recently written VCS 502d contains an index, the retrieval module 918 will retrieve the most recent, up-to-date index 504. Using the index, the application 400 may then perform any desired reads and/or writes to partitions 500 where consistency has been verified. Once these read and/or writes are completed, the VCS module 902 may write a VCS 502d to one or more of the partitions 500 and the process previously discussed may repeat.

The flowcharts and block diagrams in the Figures illustrate the architecture, functionality, and operation of possible implementations of systems, methods, and computer-usable media according to various embodiments of the present invention. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions.

The invention claimed is:

1. A system to enable an application to determine if logical objects on a volume are coherent with the last time the application wrote to the volume, the system comprising:
   at least one processor;
   at least one memory device coupled to the at least one processor and storing an application for execution on the at least one processor, the application configured to:
      upon completing a first write job to a partition on a volume residing on sequential access storage media, write a volume coherency set (VCS) to the partition, the VCS containing information for which coherency is desired;
      upon completing the first write job to the partition, make a copy of a volume change reference (VCR) value associated with the volume and store the copy in a volume coherency information (VCI) attribute associated with the partition, the VCR value configured to change in a non-repeating manner each time content on the volume is modified, the VCI attribute storing a, location identifier pointing to the VCS;
      prior to initiating a second write job to the partition, retrieve the copy from the VCI attribute and compare it to the current VCR value;
      conclude that the VCS was not modified between the first and second write jobs if the copy matches the VCR value; and
      conclude that the VCS was modified between the first and second write jobs if the copy does not match the VCR value.

2. The system of claim 1, wherein the sequential access storage media is magnetic tape housed within a cartridge.

3. The system of claim 2, wherein the VCI attribute is stored in a cartridge memory housed within the cartridge.

4. The system of claim 1, wherein the VCS contains an index for all partitions on the volume.

5. The system of claim 1, wherein the VCS contains a volume coherency count (VCC) used to determine a most recent VCS written to the volume.

6. The system of claim 5, wherein the application is further configured to store the VCC and the location identifier in the VCI attribute upon completing the first write job to the partition.

7. The system of claim 6, wherein the application is further configured to retrieve the VCC and the location identifier from the VCI attribute prior to initiating the second write job to the partition.

8. A method for an application to determine if logical objects on a volume are coherent with the last time the application accessed the volume, the method comprising:
   upon completing a first write job to a partition on a volume residing on sequential access storage media, making a copy of a volume change reference (VCR) value associated with the volume and storing the copy in a volume coherency information (VCI) attribute associated with the partition, the VCR value configured to change in a non-repeating manner each time content on the volume is modified, the VCI attribute further storing a location identifier pointing to a logical object on the partition;
   prior to initiating a second write job to the partition, retrieving the copy from the VCI attribute and comparing the copy to the current VCR value;
   concluding, by a processor, that the logical object pointed to by the location identifier was not modified between the first and second write jobs in the event the copy matches the VCR value; and
   concluding, by the processor, that the logical object pointed to by the location identifier was modified between the first and second write jobs in the event the copy does not match the VCR value.

9. The method of claim 8, wherein the sequential access storage media is magnetic tape housed within a cartridge.

10. The method of claim 9, wherein the VCI attribute is stored in a cartridge memory housed within the cartridge.

11. The method of claim 8, wherein the logical object is a volume coherency set (VCS) that was written to the partition upon completing the first write job, the VCS comprising information for which coherency is desired.

12. The method of claim 11, wherein the VCS contains an index for all partitions on the volume.

13. The method of claim 11, wherein the VCS contains a volume coherency count (VCC) to determine a most recent VCS written to the volume.

14. The method of claim 13, further comprising, upon completing the first write job to the partition, storing the VCC and the location identifier in the VCI attribute.

15. The method of claim 14, further comprising, prior to initiating the second write job to the partition, retrieving the VCC and the location identifier from the VCI attribute.

16. A computer program product to enable an application to determine if logical objects on a volume are coherent with the last time the application wrote to the volume, the computer program product comprising a non-transitory computer-readable storage medium having computer-usable program code embodied therein, the computer-usable program code comprising:
   computer-usable program code to, upon completing a first write job to a partition on a volume residing on sequential access storage media, make a copy of a volume change reference (VCR) value associated with the volume and store the copy in a volume coherency information (VCI) attribute associated with the partition, the VCR value configured to change in a non-repeating manner each time content on the volume is modified, the VCI attribute further storing a location identifier pointing to a logical object on the partition;
   computer-usable program code to, prior to initiating a second write job to the partition, retrieve the copy from the VCI attribute and compare the copy to the current VCR value;
   computer-usable program code to conclude that the logical object pointed to by the location identifier was not modified between the first and second write jobs in the event the copy matches the VCR value; and
   computer-usable program code to conclude that the logical object pointed to by the location identifier was modified between the first and second write jobs in the event the copy does not match the VCR value.

17. The computer program product of claim 16, wherein the sequential access storage media is magnetic tape housed within a cartridge.

18. The computer program product of claim 17, wherein the VCI attribute is stored in a cartridge memory housed within the cartridge.

19. The computer program product of claim 16, wherein the logical object is a volume coherency set (VCS) that was written to the partition upon completing the first write job, the VCS comprising information for which coherency is desired.

20. The computer program product of claim 19, wherein the VCS contains an index for all partitions on the volume.

21. The computer program product of claim 19, wherein the VCS contains a volume coherency count (VCC) to determine a most recent VCS written to the volume.

22. The computer program product of claim 21, further comprising computer-usable program code to, upon completing the first write job to the partition, store the VCC and the location identifier in the VCI attribute.

23. The computer program product of claim 22, further comprising computer-usable program code to, prior to initiating the second write job to the partition, retrieve the VCC and the location identifier from the VCI attribute.

* * * * *